May 12, 1970   C. V. BROWN   3,511,901
FIBRILLATION OF PLASTIC FILM
Filed May 17, 1967

INVENTOR.
C. V. BROWN
BY
*Young & Quigg*
ATTORNEYS

United States Patent Office 3,511,901
Patented May 12, 1970

3,511,901
FIBRILLATION OF PLASTIC FILM
Claude V. Brown, Bartlesville, Okla., assignor to Phillips Petroleum Company, a corporation of Delaware
Filed May 17, 1967, Ser. No. 639,145
Int. Cl. B26f 3/02; B29d 7/24
U.S. Cl. 264—154                                    8 Claims

ABSTRACT OF THE DISCLOSURE

Oriented, fibrillatable plastic film is fibrillated by subjecting the film to at least one localized stress acting in a direction oblique to its axis of orientation.

---

This invention relates to an improved method for fibrillating plastic film.

Oriented plastic film is fibrillated, e.g., split into a unitary coherent network of longitudinally extending stem fibers integrally joined to one another at random points along the length thereof by a plurality of shorter, smaller diameter cross fibers, by many methods, such as subjecting same to rotating wire brushes, an acoustical field, or whipping or hammering action, to produce a nonwoven fabric. These methods produce a fibrillated product with varying appearance and strength characteristics.

It has been found that the quality of the fibrillated product can be improved by subjecting the plastic film to be fibrillated to localized stresses that act in at least one direction substantially oblique to the orientation direction of the film. For instance, when oriented, plastic film is fed between at least one pair of counter-rotating, intermeshing rollers having spiral, V-shaped teeth and grooves, the rollers having opposing hands (one roller having teeth and grooves resembling right-hand threads; the other left-hand), the fibrillated product has parallel stem or longitudinal fibers and many interconnecting cross fibers. The parallel stem fibers, which are long and continuous, and the numerous cross fibers of the fibrillated product give added strength, bulk and softness over the products fibrillated by prior methods. Although not limited thereto, the fibrillated product of this invention has particular utility in the manufacture of improved baler twine, rope, twisted yarn, cordage, and other twisted filament articles.

Accordingly, it is an object of this invention to provide an improved method for fibrillating plastic film.

Other aspects, objects and several advantages of this invention will be apparent to those skilled in the art from the following detailed description, drawings, and appended claims.

According to this invention, an improved method for fibrillating an oriented, fibrillatable plastic film is provided whereby the film is subjected to localized stress acting in a direction oblique to the film's axis of orientation.

Figure 1:
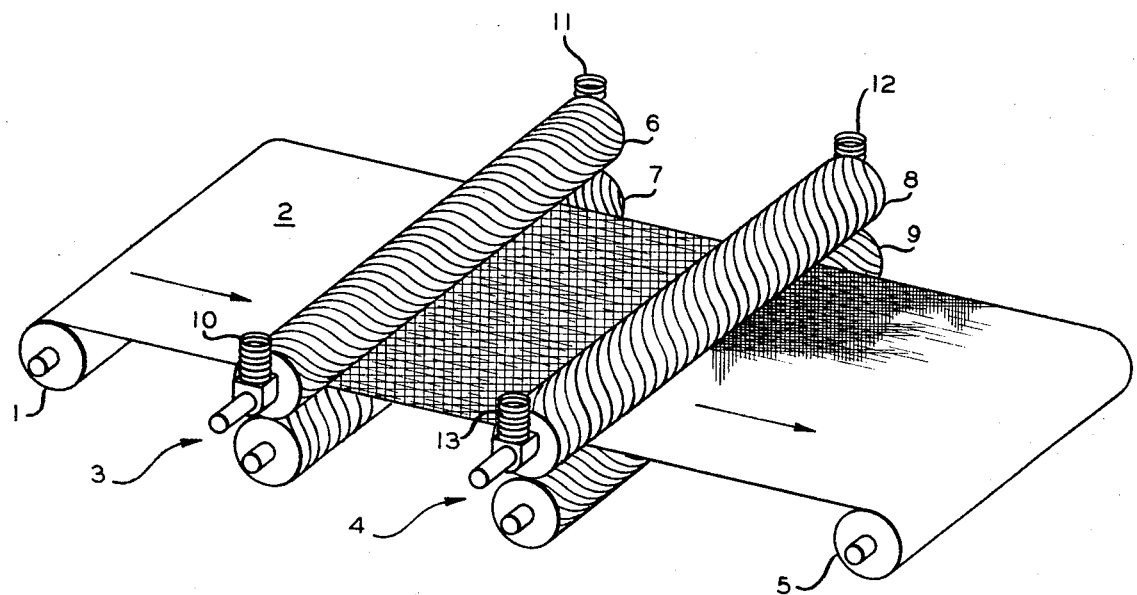
FIG. 1 is a diagrammatic perspective view of a system embodying this invention.

FIG. 1 shows two pairs of counter-rotating, intermeshing rollers, 3 and 4, with each roller 6, 7, 8, 9 having spiral, V-shaped teeth and grooves with the top and bottom rollers having teeth and grooves of opposite hand, i.e., as shown, the teeth and grooves on roller 6 are right-hand and the teeth and grooves on roller 7 are left-hand. Longitudinally oriented, plastic film 2 is passed between the first pair of rollers 3 from feed roll 1. Film 2 is then passed between a second pair of counter-rotating, intermeshing rollers 4. The fibrillated product emerging from between the second pair of rollers 4 is taken up on roll 5 for storage, further processing, and the like. Rollers 6, 7, 8, and 9 can be formed from any hard surface material, preferably a metallic material such as stainless steel.

Figure 2:
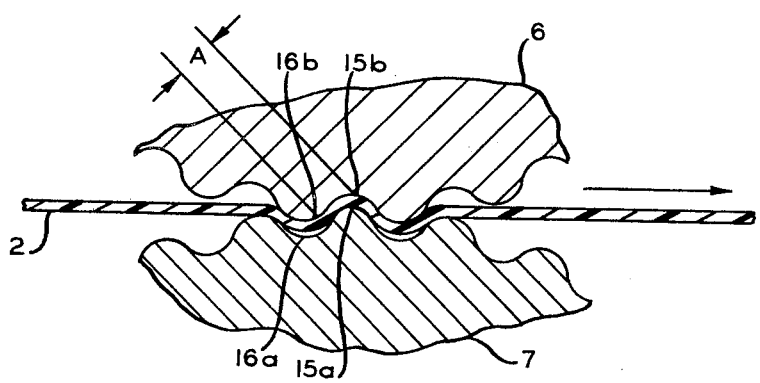
FIG. 2 is an enlarged, fragmentary, sectional view of the rollers illustrated in FIG. 1 shown with plastic film passing therethrough.

The application of stresses which are oblique to the axis of film orientation can be described by referring to FIG. 2 which shows a portion of rollers 6 and 7 with film 2 passing therebetween. The spiral, V-shaped teeth on the rollers are arranged so that the crowns of the teeth on one of the rollers engage with the grooves on the other roller. As the film 2 passes through rollers 6 and 7, a portion is clamped between the crown 15a of one tooth on roller 7 and one groove 15b on roller 6 thereby restraining any movement of that portion. As the rollers rotate in the direction of the arrows, the crown 16b of the adjoining tooth on roller 6 forces the film down into groove 16a on roller 7 causing a finite movement or distention of a portion of film 2, shown by A, and fibrillation results. This action extends across the entire width of the film as it passes between the rollers. As the intermeshing, spiral teeth distend the film, the resultant force vector of the stresses imposed therein is not entirely parallel to the longitudinal axis of the film orientation because the teeth and grooves on the rollers make an oblique angle with the axis of the film orientation. The application of these stresses in an oblique direction produces a fibrillated product with numerous cross fibers along with parallel stem fibers. The numerous cross fibers provide improved strength, bulk and softness to the fibrillated product. The film is also sligly crimped as it passes between the rollers giving it a "herring bone" appearance.

A second pair of rollers 4 with teeth and grooves arranged in the opposite hand from those of the first pair of rollers 3, i.e., the teeth and grooves of top roller 6 of first pair 3 is right-hand and the teeth and grooves of the top roller of the second pair 4 are left-hand, is shown in FIG. 1. This arrangement provides further fibrillation to obtain finer stem and cross fibers which may be desirable for certain applications of the fibrillated product. A series of pairs of rollers with this type arrangement may be used to obtain even further fibrillation if desired. For example, for thicker, tougher, less-oriented film three or more pairs of rollers can be employed. Of course, for some applications of the product fibrillated by this invention, only one pair of rollers will be required to obtain the desired fibrillation.

Passing film fibrillated by the system shown in FIG. 1 through at least one additional pair of rollers having teeth parallel to the axis of the film orientation results in further improved strength and break characteristics in twisted filaments produced therefrom. These additional rollers, which will not provide adequate initial fibrillation for many plastic films imparts a spreading action which apparently produces the above desirable characteristics in the twisted filaments.

The rollers themselves can be of any diameter and the spacing of the pair of rollers, if more than one pair is used, can be any distance from one another. They are preferably spaced at least one circumference from one another. To obtain a more uniform fibrillation of the film, all rollers are preferably powered, although it is within the scope of this invention to power only one roller in each pair.

The extent of fibrillation can be controlled to some degree by varying the angle that the roller teeth and grooves make with the axis of film orientation. Varying this angle changes the direction of the resultant force vector imposed on the film as it passes between the intermeshing rollers thereby effecting the number and arrangement of cross fibers. The preferred range for this angle is 20 to 60° with 45° being the most preferred.

The rotational speed of the rollers can vary widely. For example, from as low as ten revolutions per minute to as high as 500 or more revolutions per minute depending upon the degree of fibrillation desired, the type of film treated, the degree of orientation of the film, and the like. If more than one pair of rollers is used, all rollers are preferably rotated at the same speed; however, if desired, the downstream pair of rollers can be rotated at a slightly higher speed than the preceding pair thereby increasing the amount of tension applied along the axis of the film orientation and increasing the amount of fibrillation.

One roller in each pair of rollers is preferably spring-loaded so that it is biased toward its mating roller as the teeth and grooves are enmeshing as illustrated by FIG. 1. The pressure at which a roller is biased may be adjustably determined by adjustment of loading springs 10, 11, 12, 13 attached to rollers 6 and 8. The amount of pressure between the rollers depends upon the material being fibrillated, its thickness, toughness, degree of orientation, and the like, but is always less than the amount which would adversely crush or sever the film.

The spiral, V-shaped teeth and grooves on the rollers can vary widely as to their pitch, depth and spacing along the longitudinal axis of the roller. The extent to which the film is fibrillated can be controlled to some degree by varying the number of teeth per linear inch along the longitudinal axis of the roller. For example, fibrillation can be obtained with as few as three teeth per inch; however, fibrillated products having finer stem and cross fibers are produced with a larger number of teeth per inch, e.g., 10 to 20 teeth per inch. The number of teeth used also depends upon the thickness of the material. For instance, it has been found that with a 5-mil sheet of oriented, foamed plastic film about 5 teeth per inch is the most desirable. Generally, with thinner materials more teeth are required to obtain the desired fibrillation.

The depths of the grooves and teeth depend primarily upon the thickness of the film. The grooves have to be deep enough to obtain the desired film distention as the teeth mesh but cannot be so deep that the film is cut or adversely crushed. For example, an acceptable range for the groove depth is about 0.025 to 0.10 inch for most plastic films of less than 10 mils thickness.

Generally, any orientable plastic film can be employed in the process of this invention. The film can be uniaxially oriented or multiaxially oriented in any manner which allows fibrillation. The film can be oriented by any conventional method well known to those skilled in the art, and then oriented by stretching in at least one direction, or by heating the film to a temperature below the level at which it becomes molten and then stretching it in at least one direction. The film is stretched in at least one direction to effect a 200 to 1200, preferably 300 to 1000 percent increase in length in the stretched direction over the original length of the film.

Generally, films of homopolymers and copolymers of 1-olefins having 2 to 8 carbon atoms per molecule, which have been oriented by stretching in at least one direction so that the film after stretching is at least two times longer in the direction of stretching that it was before stretching, can be used. When film of polyethylene which has a density of at least 0.94 gram per cubic centimeter at 20° C. is employed, the ratio of length in the stretched direction to the original length should be at least 4 to 1; and when film of polypropylene is used, this ratio should be at least 6 to 1. Polymers of 1-olefins can be made in any conventional manner, such as by the process of U.S. 2,825,721, or with any of the well-known organometal catalyst systems.

The film can be made from the polymers in any conventional manner such as by melt extrusion, casting, flattening blown tubing, and the like. Although not necessary, the film can be a foamed plastic film produced by any conventional process. The presently preferred method for producing the foamed plastic film, if used, is melt extruding the plastic into the form of film, orienting same and then cooling the film to approximately ambient temperature. Particulate solid blowing agents which decompose substantially at the temperature of the film formation process thereby evolving gases which form gas pockets and gas bubbles in the final film are added to the plastic. As is known in the art, other additives such as dispersants, promoters, retarders and stabilizers can be employed along with the above blowing agents.

Other conventional plastic oriented films that can be employed in this invention include blends of the above-mentioned 1-olefin polymer with each other and with other polymers such as polyamides (nylons), polyesters, polyvinyl alcohol, acrylic polymers, and the like. Of course, these other polymers can also be employed alone as well as in blends. A stretch or orientation ratio of at least 2 to 1 up to the breaking point can also be employed with these films.

The film can be of any length and width and substantially any thickness, the minimum thickness of the film being that which will produce a substantially self-sustaining film and the maximum thickness being dictated by the capability of the apparatus employed. Preferably, the thickness of the film will vary from that which is sufficient to form a self-sustaining film to about 6 mils. Thicker films can be fibrillated by this process by using heavier duty apparatus, or by using an arrangement of three or more pairs of rollers in series, as discussed previously.

The following examples are presented to illustrate specific embodiments of the invention and are not intended to unduly limit same.

EXAMPLE I

An 8-mil thick, foamed polypropylene film having a density of 0.6 gram per cubic centimeter at 20° C. was heated to 300° F. and oriented by stretching so that the length in the direction of stretching was eight times longer.

A fibrillating system similar to that shown in FIG. 1 having one pair of brass rollers with a diameter of 1⅞ inches was employed. The grooves and teeth on the rollers, spaced at about 10 per linear inch along the longitudinal axis thereof, were arranged to form an angle of approximately 60 degrees with the longitudinal axis of the film's direction of orientation being fed therebetween, were 0.025 inch deep, and had rounded valleys and crowns.

Oriented polypropylene film described above was fed between the enmeshing rollers which were rotating at approximately 100 revolutions per minute. Two passes in opposite directions were made.

A uniformly fibrillated product having a network of substantially parallel and continuous, longitudinally extending stem fibers, each joined integrally to the adjacent stem fiber by numerous cross fibers, was obtained.

EXAMPLE II

Fibrillated product from Example I was fed between rotating plastic rollers, rotating at approximately 100 revolutions per minute, which had generally the same configuration as the rollers in Example I except the grooves were spaced about 10 per linear inch along the longitudinal axis of the rolls and were not arranged helically, but circumferentially, so that the grooves were parallel to the orientation direction of the film. The distance between the longitudinal stem fibers of the fibrillated product was increased by these rollers.

EXAMPLE III

A flailing-needle type apparatus was used to fibrillate oriented polypropylene foamed film described in Example I. This apparatus comprised needles rotatably and slidably attached to sixteen, ¼-inch bars spaced around the periphery of two 3-inch diameter plates, the bars and plates forming a drum shape. Eighty steel, 3-inch long, 16-gauge upholstery needles 1/16 inch in diameter were carried by each of the bars.

The drum was rotated at approximately 800 revolutions per minute so that the needles stood out from the bars. The film was then drawn past the rotating drum at about 80 feet per second so that the needles extended through the film and fibrillated same.

Fibrillated film from Examples I, II, and III was twisted about one turn per inch to form a twine and this twist was heat set at about 220° F. The twine so made was subjected to standard tests (ASTM D1380–61T) to determine various strength characteristics. The results of these tests are tabulated in Table I.

TABLE I

| Characteristic | Fibrillated product | | |
|---|---|---|---|
| | Example I | Example II | Example III |
| Denier | 27,650 | 27,740 | 27,600 |
| Tenacity, g./den | 3.12 | 3.50 | 2.62 |
| Force to break, lbs | 190 | 213 | 159 |
| Knot tenacity, [1] g./den | 1.74 | 1.72 | 1.68 |
| Force to break knot,[1] lbs | 106 | 105 | 102 |
| Elongation, percent | 48 | 54 | 37.7 |

[1] Baler knot.

From these results it can be seen that twine made from plastic film fibrillated in accordance with this invention has better tenacity, strength and bulk without any degradation when knotted.

Reasonable variations and modifications are possible within the scope of this disclosure without departing from the spirit and scope thereof.

I claim:

1. In a fibrillation process, the improvement comprising directing a moving plane of fibrillatable film through a zone wherein said film is deviated from said initially directed plane of motion to a new plane of motion and subjecting said film during said deviation to a multiplicity of intermittently applied, substantially parallel, tensile stresses, wherein each of said stresses acts at an angle within said new plane of motion which is neither perpendicular nor parallel to the direction of motion of said film.

2. The process of claim 1 wherein said direction of motion is parallel to the orientation direction of said film.

3. The process of claim 2 wherein each of said angles of stress is in the range of 20 to 60 degrees.

4. The process of claim 2 wherein said film is formed from at least 1 of the homopolymers and copolymers of 1-olefins having from 2 to 8 carbon atoms per molecule, polyamides, polyesters, polyvinyl alcohol, acrylic polymers, and mixtures thereof.

5. The process of claim 2 wherein said film is formed from at least one of the homopolymers and copolymers of 1-olefins having from 2 to 8 carbon atoms per molecule, polyamides, polyesters, polyvinyl alcohol, acrylic polymers, and mixtures thereof which have been foamed prior to orientation.

6. The process of claim 5 wherein said foamed film is formed from polypropylene which is thereafter oriented using a drawing ratio of at least 6 to 1.

7. An improved fibrillation apparatus comprising in combination means of introducing fibrillatable film into a fibrillating means, fibrillating means comprising at least one pair of interemshing, counterrotating rollers, each of said rollers having teeth and grooves threaded in opposite hand one to another at an angle which is neither perpendicular nor parallel to the direction of motion of said film which is passed therebetween, means to power said rollers, and means of recovering said film from said fibrillating means.

8. The apparatus of claim 7 wherein said angle is in the range of 20 to 60 degrees.

References Cited

UNITED STATES PATENTS

| | | |
|---|---|---|
| 3,345,242 | 10/1967 | Rasmussen. |
| 3,350,491 | 10/1967 | Rasmussen. |
| 3,416,772 | 12/1968 | Sheehan. |

FOREIGN PATENTS

| | | |
|---|---|---|
| 395,212 | 1964 | Japan. |

ROBERT F. WHITE, Primary Examiner

A. M. SOKAL, Assistant Examiner

U.S. Cl. X.R.

225—3, 93; 264—54, 147, 321

Disclaimer and Dedication 3,511,901.—*Claude V. Brown*, Bartlesville, Okla. FIBRILLATION OF PLAS-
TIC FILM. Patent dated May 12, 1970. Disclaimer and dedication
filed Dec. 28, 1971, by the assignee, *Phillips Petroleum Company*.

Hereby disclaims said patent and dedicates to the Public the remaining term of said patent.

[*Official Gazette April 11, 1972.*]